(12) United States Patent
Hering et al.

(10) Patent No.: US 11,237,091 B2
(45) Date of Patent: Feb. 1, 2022

(54) HUMIDITY CONDITIONING FOR WATER-BASED CONDENSATIONAL GROWTH OF ULTRAFINE PARTICLES

(71) Applicant: Aerosol Dynamics Inc., Berkeley, CA (US)

(72) Inventors: Susanne Vera Hering, Berkeley, CA (US); Arantzazu Eiguren Fernandez, Richmond, CA (US); Gregory Stephen Lewis, Berkeley, CA (US); Steven Russel Spielman, Oakland, CA (US); Philip Bourgeois, Woodside, CA (US)

(73) Assignee: Aerosol Dynamics Inc., Berkeley, CA (US)

( * ) Notice: Subject to any disclaimer, the term of this patent is extended or adjusted under 35 U.S.C. 154(b) by 59 days.

(21) Appl. No.: 16/671,594

(22) Filed: Nov. 1, 2019

(65) Prior Publication Data

US 2020/0141853 A1 May 7, 2020

Related U.S. Application Data

(60) Provisional application No. 62/754,537, filed on Nov. 1, 2018.

(51) Int. Cl.
*F24F 6/04* (2006.01)
*G01N 15/06* (2006.01)

(52) U.S. Cl.
CPC ........... *G01N 15/065* (2013.01); *F24F 6/043* (2013.01)

(58) Field of Classification Search
CPC ............................... F24F 6/043; G01N 15/065

USPC ................................................... 261/99, 104
See application file for complete search history.

(56) References Cited

U.S. PATENT DOCUMENTS

| 2,042,095 | A | 5/1936 | Grant |
| 2,684,008 | A | 7/1954 | Vonnegut |
| 2,721,495 | A | 10/1955 | Schaefer |
| 3,011,387 | A | 12/1961 | Johnson |
| 3,011,390 | A | 12/1961 | Van Luik |
| 3,037,421 | A | 6/1962 | Bigelow |

(Continued)

FOREIGN PATENT DOCUMENTS

| DE | 102005001992 | 7/2006 |
| EP | 0658461 | 11/1993 |

(Continued)

OTHER PUBLICATIONS

PCT International Search Report dated Jan. 31, 2020, PCT Patent Application No. PCT/US2019/059402.

(Continued)

*Primary Examiner* — Charles S Bushey
(74) *Attorney, Agent, or Firm* — Vierra Magen Marcus LLP

(57) ABSTRACT

A particle growth apparatus includes a temperature-controlled humidifier coupled to a water-based condensation growth system. The humidifier may include a tube of sulfonated tetrafluoroethylene-based fluoropolymer-copolymer and surrounded by a region containing water or water vapor. The apparatus includes a wetted wick and wick sensor in the condensation growth system, configured such that the gas sample flows through the sulfonated tetrafluoroethylene-based fluoropolymer-copolymer tube into the condensation growth system.

8 Claims, 5 Drawing Sheets

(56) References Cited

U.S. PATENT DOCUMENTS

| | | | |
|---|---|---|---|
| 3,592,546 | A | 7/1971 | Gussman |
| 3,632,210 | A | 1/1972 | Rich |
| 3,694,085 | A | 9/1972 | Rich |
| 3,738,751 | A | 6/1973 | Rich |
| 3,806,248 | A | 4/1974 | Sinclair |
| 3,890,046 | A | 6/1975 | Hart |
| 4,293,217 | A | 10/1981 | Bird |
| 4,449,816 | A | 5/1984 | Kohsaka |
| 4,761,074 | A | 8/1988 | Kohsaka |
| 4,790,650 | A | 12/1988 | Keady |
| 4,792,199 | A | 12/1988 | Borden |
| 4,868,398 | A | 9/1989 | Mulcey |
| 4,950,073 | A | 8/1990 | Sommer |
| 4,967,187 | A | 10/1990 | Dumas |
| 5,011,281 | A | 4/1991 | Harris |
| 5,026,155 | A | 6/1991 | Ockovic |
| 5,098,657 | A | 3/1992 | Blackford |
| 5,118,959 | A | 6/1992 | Caldow |
| 5,176,723 | A | 1/1993 | Liu |
| 5,239,356 | A | 8/1993 | Hollander |
| 5,278,626 | A | 1/1994 | Poole |
| 5,348,691 | A * | 9/1994 | McElroy ............ F24F 3/14 261/36.1 |
| 5,519,490 | A | 5/1996 | Nakata |
| 5,525,514 | A | 6/1996 | Jacobs |
| 5,659,388 | A | 8/1997 | Scheer |
| 5,675,405 | A | 10/1997 | Schildmeyer |
| 5,872,622 | A | 2/1999 | Schildmeyer |
| 5,903,338 | A | 5/1999 | Mavliev |
| 6,330,060 | B1 | 12/2001 | Flagan |
| 6,469,780 | B1 | 10/2002 | McDermott |
| 6,498,641 | B1 | 12/2002 | Schildmeyer |
| 6,529,272 | B2 | 3/2003 | Flagan |
| 6,567,157 | B1 | 5/2003 | Flagan |
| 6,829,044 | B2 | 12/2004 | Liu |
| 6,980,284 | B2 | 12/2005 | Ahn |
| 7,494,567 | B2 | 2/2009 | Haran |
| 7,656,510 | B2 | 2/2010 | Roberts |
| 7,719,683 | B2 | 5/2010 | Ahn |
| 7,724,368 | B2 | 5/2010 | Ahn |
| 7,828,273 | B2 | 11/2010 | Molter |
| 7,988,135 | B2 | 8/2011 | Molter |
| 8,072,598 | B2 | 12/2011 | Ahn |
| 8,459,572 | B2 | 6/2013 | Hering |
| 8,465,791 | B2 | 6/2013 | Liu |
| 8,576,400 | B2 | 11/2013 | Hulteen |
| 8,603,247 | B2 | 12/2013 | Liu |
| 9,535,022 | B1 | 1/2017 | Meredith |
| 9,579,662 | B2 | 2/2017 | Hering |
| 9,610,531 | B2 | 4/2017 | Hering |
| 10,583,410 | B2 * | 3/2020 | Kulkarni ............ B01J 2/006 |
| 11,029,240 | B2 * | 6/2021 | Hering ............... F28B 1/02 |
| 2003/0020910 | A1 | 1/2003 | Peterson |
| 2006/0146327 | A1 * | 7/2006 | Wang ............. G01N 15/0266 356/338 |
| 2007/0023939 | A1 * | 2/2007 | Hepple ............... G10G 7/00 261/104 |
| 2012/0045752 | A1 * | 2/2012 | Ensor ............... B82Y 15/00 435/5 |
| 2014/0134507 | A1 * | 5/2014 | Fasold ............ H01M 8/04149 429/413 |
| 2015/0293016 | A1 | 10/2015 | Perkins |
| 2018/0045636 | A1 | 2/2018 | Avula |

FOREIGN PATENT DOCUMENTS

| | | |
|---|---|---|
| JP | 2003 222605 | 8/2003 |
| JP | 4108034 | 6/2008 |
| WO | 2019/075474 | 4/2019 |

OTHER PUBLICATIONS

PCT Written Opinion of the International Searching Authority dated Jan. 31, 2020, PCT Patent Application No. PCT/US2019/059402.

PCT International Preliminary Reporton Patentability dated May 14, 2021, International Application No. PCT/US2019/059402.

Hoppel, W. A., Twomey, S., & Wojciechowski, T. A. (1979). A segmented thermal diffusion chamber for continuous measurements of CN. Journal of Aerosol Science, 10(4), 369-373.

Leaitch, R., & Megaw, W. J. (1982). The diffusion tube; a cloud condensation nucleus counter for use below 0.3% supersaturation. Journal of Aerosol Science, 13(4), 297-319.

Bricard, J., Delattre, P., Madelaine, G. and Pourprix, M., 1976, in Fine Particles (Edited by Liu, B. Y. H.) Academic Press, New York, pp. 565-580.

"Argawal and Sem J., 1980, Continuous flow, single-particle-counting condensation nucleus counter, Journal of Aerosol Science, vol. I I, pp. 343-357".

Hering, S. V., & Stolzenburg, M. R. (2005). A method for particle size amplification by water condensation in a laminar, thermally diffusive flow. Aerosol Science and Technology, 39(5), 428-436.

Hering, S. V., Stolzenburg, M. R., Quant, F. R., Oberreit, D. R., & Keady, P. B. (2005). A laminar-flow, water-based condensation particle counter (WCPC). Aerosol Science and Technology, 39(7), 659-672.

Weber, R. J., Orsini, D., Daun, Y., Lee, Y. N., Klotz, P. J., & Brechtel, F. (2001). A particle-into-liquid collector for rapid measurement of aerosol bulk chemical composition. Aerosol Science & Technology, 35(3), 718-727.

Eiguren Fernandez, A., Lewis, G. S., & Hering, S. V. (2014). Design and laboratory evaluation of a sequential spot sampler for time-resolved measurement of airborne particle composition. Aerosol Science and Technology, 48(6), 655-663.

Hering, S. V., Lewis, G. S., Spielman, S R., & Eiguren-Fernandez, A. (2019). A Magic concept for self-sustained, water-based, ultrafine particle counting. Aerosol Science and Technology, 53(1), 63-72.

Skala, G. F. (1963). A New Instrument for the Continuous Measurement of Condensation Nuclei. Analytical Chemistry, 35(6), 702-706.

Hering, et al., U.S. Appl. No. 16/159,604 Wick Moisture Sensor for Airborne Particle Condensational Growth Systems, filed Oct. 12, 2018.

PCT International Search Report dated Mar. 15, 2019, PCT Patent Application No. PCT/US2018/055911.

PCT Written Opinion of the International Searching Authority dated Mar. 15, 2019, PCT Patent Application No. PCT/US2018/055911.

Office Action dated Sep. 3, 2019, U.S. Appl. No. 16/159,604.

Roberts, G.C., & Nenes, A. (2005). A continuous-flow streamwise thermal-gradient CCN chamber for atmospheric measurements. Aerosl Science and Technology, 39(3), 206-221.

* cited by examiner

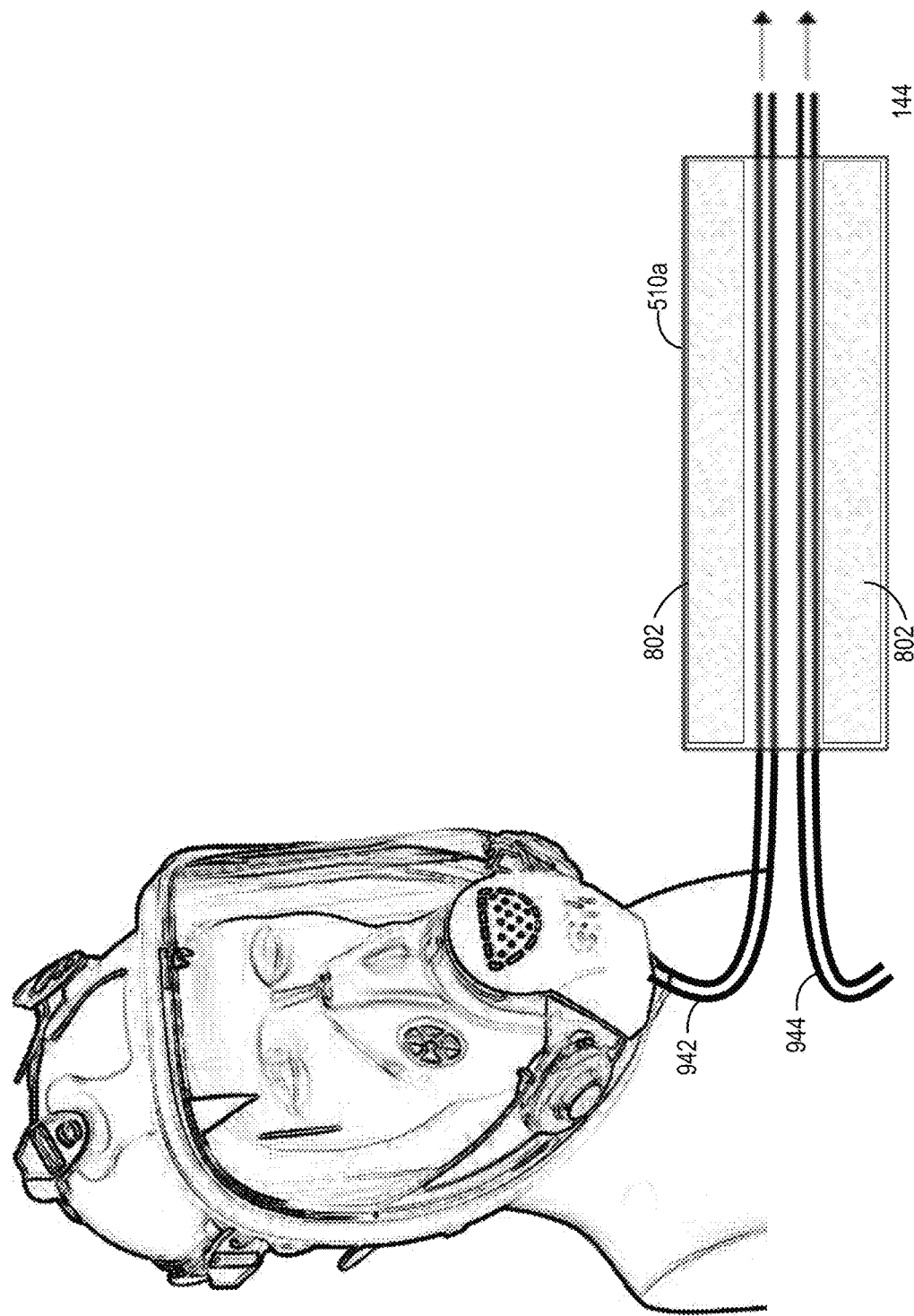

HUMIDITY CONDITIONING FOR WATER-BASED CONDENSATIONAL GROWTH OF ULTRAFINE PARTICLES

CROSS REFERENCE TO RELATED APPLICATIONS

This application claims the benefit of U.S. Provisional Patent Application No. 62/754,537 filed on Nov. 1, 2018.

GOVERNMENT RIGHTS

This invention was made with government support under contract HDTRA1-16-C-0065 awarded by the United States Department of Defense. Defense Threat Reduction Agency. The government has certain rights to this invention.

FIELD

The technology pertains to the measurement of particles suspended in air or other gas.

BACKGROUND

For many decades particle condensation methods have been used to enable the detection, or collection of submicrometer-sized particles suspended in air or other gas. More recently, condensational growth has also been applied to aerodynamics focusing, or to enhance the electrical charging of these ultrafine particles. Condensational growth is used because individual gas-borne particles smaller than about 100 nm are difficult to detect optically and are difficult to manipulate by inertial means. Condensation has been used to enlarge particles as small as a few nanometers, or a few tens of nanometers in diameter, to form micrometer sized droplets, which are then detected optically, collected inertially, or otherwise manipulated.

For water condensation systems used in particle counters, it is advantageous to condition the flow to a moderately high, or high relative humidity prior to measurement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One general aspect includes a particle growth apparatus. The apparatus includes a temperature-controlled humidifier coupled to a water-based condensation growth system. The humidifier may include a tube which may comprise sulfonated tetrafluoroethylene-based fluoropolymer-copolymer and may be surrounded by a region containing water or water vapor. The apparatus also includes a wetted wick and wick sensor in the condensation growth system. The apparatus also includes the humidifier configured such that the gas sample flows through the sulfonated tetrafluoroethylene-based fluoropolymer-copolymer tube into the condensation growth system.

Another aspect of the technology is an apparatus including a humidifier coupled to a water-based condensation growth system. The humidifier may include a tube comprising sulfonated tetrafluoroethylene-based fluoropolymer-copolymer surrounded by a region containing wetted crystals of polyacrylate salt. A gas sample flows through the sulfonated tetrafluoroethylene-based fluoropolymer-copolymer tube into the condensation growth system.

BRIEF DESCRIPTION OF THE DRAWINGS

FIG. 9 illustrates an application of the device shown in FIG. 5.

DETAILED DESCRIPTION

The technology pertains to the measurement of particles suspended in air or other gas. More specifically, the technology pertains to devices and methods in which the size of particles is enlarged through condensation of water vapor onto the particle. These particle condensation techniques are most commonly applied to the detection, collection or inertial manipulation of airborne particles that are smaller than a few micrometers, or a few hundred nanometers in diameter.

This technology provides a method and apparatus to readily condition the humidity of the flow carrying the particles of interest and its incorporation into a particle condensation system for which the condensing fluid is water. It is of specific interest to those systems that recover water vapor internally, within the particle condensational growth region. Such systems can be configured to provide sustained operation without addition of water in instances when the sampled air flow is at sufficiently high relative humidity. This technology addresses practical means to condition the relative humidity of that sampled air flow to thereby allow continued, sustained operation under a wide range of environmental conditions. Although application is to measurement of particles in air, it may also be applied to systems where the carrier is nitrogen, or other gas.

FIG. 1 illustrates an apparatus 100 for condensationally enlarging the particulate matter suspended air or other gas. The system 100 comprises of a humidity conditioner (or humidifier) 110 and water condensation growth tube 120. The humidity conditioner may optionally include a heater or temperature controller 146. The growth tube 120 is equipped with a wick 130 to maintain wet walls, and a wick sensor 135 to detect the level of wick saturation (generally with water or other fluid). The system 100 enlarges the particulate matter suspended air or other gas through water condensation, in which the flow of suspended particulate matter is introduced into a humidity conditioner 110, and then into a water condensation growth tube 120. The growth tube 120 subjects the flow to changes in temperature in a manner that creates relative humidity levels in excess of 100% within much of the flow, thereby initiating the condensational growth onto the suspended particles. The condensation growth tube may be a laminar flow instrument, such as the water condensation method described by Hering et al. (Hering, S. V., & Stolzenburg, M. R. (2005). A method for particle size amplification by water condensation in a laminar, thermally diffusive flow. *Aerosol Science and Technology,* 39(5), 428-436; Hering, S. V., Stolzenburg, M. R., Quant, F. R., Oberreit, D. R., & Keady, P. B. (2005). A laminar-flow, water-based condensation particle counter (WCPC). *Aerosol Science and Technology,* 39(7), 659-672; and Hering, S. V., Lewis, G. S., Spielman, S. R., & Eiguren-Fernandez, A. (2019). A MAGIC concept for self-sustained, water-based, ultrafine particle counting. *Aerosol Science and Technology,* 53(1), 63-72. (hereinafter Hering et al. (2019)), or the flexible working fluid method described in German Patent DE 10 2005 001 992 A1, or the stream-wise gradient method described in U.S. Pat. No. 7,656,510 and (Roberts, G. C., & Nenes, A. (2005). A continuous-flow streamwise thermal-gradient CCN chamber for atmospheric measurements. *Aerosol Science and Technology,* 39(3), 206-221). It could also be an adiabatic expansion type instrument, such as described by Skala, G. F. (1963) (A New Instrument for the Continuous Measurement of Condensation Nuclei. *Analytical Chemistry,* 35(6), 702-706), or a mixing type instrument such as described by U.S. Pat. No. 8,465,791. All of these water-based condensation growth systems work by creating supersaturated conditions, defined as regions in which the relative humidity exceeds 100%. The higher the supersaturation level, the smaller the particle that is activated to grow through uptake of water vapor.

Each of these water-based condensation growth systems would be aided by having known, high relative humidity at the growth tube inlet. For some, the humidity conditioning also enables sustained operating without the need to provide liquid water to the growth tube itself. Many condensation systems are equipped with a wick that holds the liquid which must be evaporated to create the supersaturation. Some of these also have a region of water vapor recovery. As described by Hering et al (2019), incorporation of a water vapor recovery region enables the condensation growth tube to operate without consuming water, provided the sampled flow is sufficiently humid. Thus, coupling to a humidity conditioner at the inlet, and with appropriate feedback control, enables sustained operation, without the need to add water to the growth tube itself.

With reference to FIG. 1, a flow 142 containing suspended particles enters the humidity conditioner 110 at the inlet 140, where it is brought to a desired humidity and temperature. The flow is then introduced into a laminar flow type particle condensation growth tube 120. The growth tube has a wick 130 that lines interior walls through which the flow passes. The growth tube 120 also has two or more temperature regions. When the wick is wet, the warmer regions evaporate water into the otherwise colder flow, creating a region of supersaturation, and thereby activating the condensational growth of the suspended particles. The flow exits the growth tube at the output, carrying condensationally enlarged particles. These condensationally enlarged particles are droplets, much as in a cloud, as they form around individual particles in the flow.

For proper operation of the system of FIG. 1, the wick should be wet, but not flooded, i.e. it must be able to absorb water vapor that condenses on its surface. FIG. 1 shows a wick sensor 135, located within the interior of the growth tube 120, which detects the saturation level of the wick 130. This wick sensor provides a feedback signal 125 which is used to adjust the operating conditions of the humidity conditioner 110 and growth tube 120 to maintain the wick 130 at the target saturation level. Such adjustment in operating conditions can be through controlling the temperature of the humidity conditioner, or of the water vapor recovery region of the growth tube, or both, using a microprocessor controller 160. If the wick sensor indicates that the wick is drying, the temperature of the humidifier can be increased to provide more humidity into the growth tube. The thermistor 144 measures the temperature inside the humidifier, and the microprocessor 160 controls the heater 146 to achieve the degree of humidification required to keep the wick moist, as indicated by the wick sensor. The output flow 142 of the growth tube 120 may be provided to a particle counter.

FIG. 2 shows a humidifier using a sulfonated tetrafluoroethylene-based fluoropolymer-copolymer consisting of a length of sulfonated tetrafluoroethylene-based fluoropolymer-copolymer tubing contained within a water bath, and optionally with a temperature controller for the water bath.

FIG. 2 illustrates a commonly used approach of humidifying a gas stream. The air or gas flow to be humidified is passed through a length of sulfonated tetrafluoroethylene-based fluoropolymer-copolymer (commonly sold as Nafion™ tubing from PermaPure, LLC (www.permapure.com, Lakewood, N.J.)) that is housed in a bath of water. Alternatively, the tubing may be surrounded by a humid flow. The sulfonated tetrafluoroethylene-based fluoropolymer-copolymer is a co-polymer that is highly selective in the transport of water. The sulfonated tetrafluoroethylene-based fluoropolymer-copolymer membrane absorbs water from region of high-water content and releases this water to the region of low humidity.

More specifically the tubing is a copolymer of tetrafluoroethylene (Teflon®) and perfluoro-3,6-dioxa-4-methyl-7-octene-sulfonic acid that was developed by DuPont. The tubing used is highly resistant to chemical attack, but the presence of its exposed sulfonic acid groups provides the water absorption characteristics. Sulfonic acid has a very high water-of-hydration, absorbing 13 molecules of water for every sulfonic acid group in the polymer; consequently, the tubing can absorb 22% by weight of water. When one side of the sulfonated tetrafluoroethylene-based fluoropolymer-copolymer membrane is in contact with a humid flow or with liquid water, the sulfonated tetrafluoroethylene-based fluoropolymer-copolymer becomes hydrated. Interconnections between the sulfonic acid groups lead to very rapid transfer of water across the sulfonated tetrafluoroethylene-based fluoropolymer-copolymer membrane. The extent of hydration at the surface of the sulfonated tetrafluoroethylene-based fluoropolymer-copolymer depends on the water content of the space it adjoins, and thus the hydrated sulfonated tetrafluoroethylene-based fluoropolymer copolymer will then release the hydrated water to the less humid flow on the opposite side of the membrane. This property makes sulfonated tetrafluoroethylene-based fluoropolymer-copolymer suitable for either humidification or dehumidification. Because the hydration process is essentially a chemical reaction, indeed is described as a first order kinetic reaction, the rate of water vapor transport depends not only on the relative humidity of the flow on either side of the sulfonated tetrafluoroethylene-based fluoropolymer-copolymer membrane, but also on its temperature. This material is manufactured by PermaPure LLC, and sold under the trade name Nafion.

Figure 3:
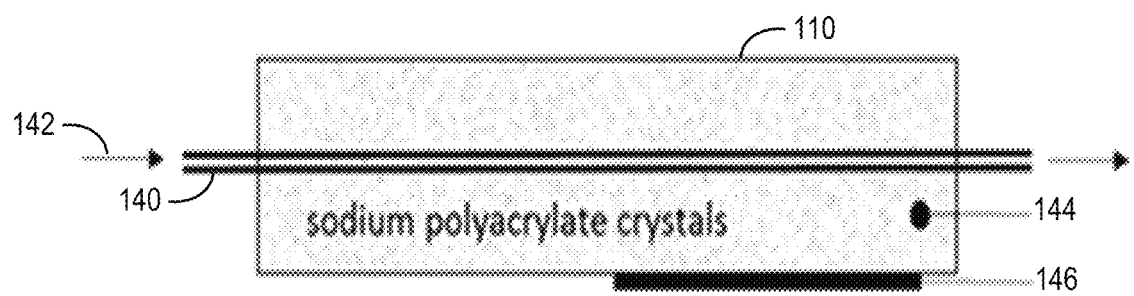
FIG. 3 depicts a humidity conditioner in accordance with the present technology comprising a length of sulfonated tetrafluoroethylene-based fluoropolymer-copolymer tubing passing through a container filled with sodium polyacrylate crystals, and optionally including a container temperature controller.

In another alternative, rather than using humid air flow or water bath, a sulfonated tetrafluoroethylene-based fluoropolymer-copolymer tube is run through a bed of sodium polyacrylate crystals. FIG. 3 depicts a humidity conditioner in accordance with the present technology comprising a length of sulfonated tetrafluoroethylene-based fluoropolymer-copolymer tubing passing through a container filled with sodium polyacrylate crystals, and optionally including a container temperature controller. The tubing can pass directly through the sodium polyacrylate, as illustrated in FIG. 3.

Figure 1:
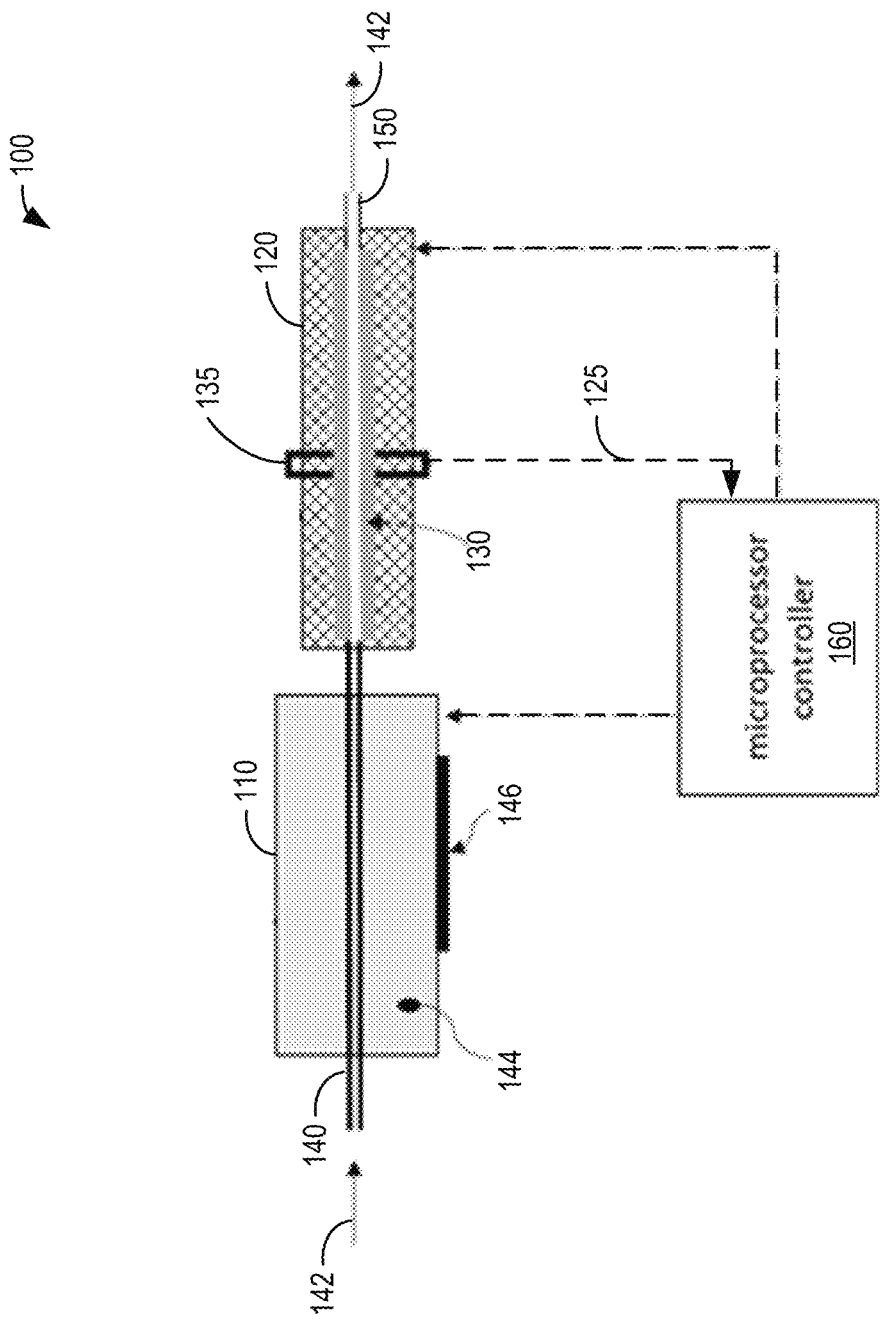
FIG. 1 depicts a system for condensationally enlarging the particulate matter suspended air or other gas, consisting of a humidity conditioner and water condensation growth tube, the growth tube equipped with a wick to maintain wet walls, and a wick sensor to detect the level of wick water saturation.
Figure 4:
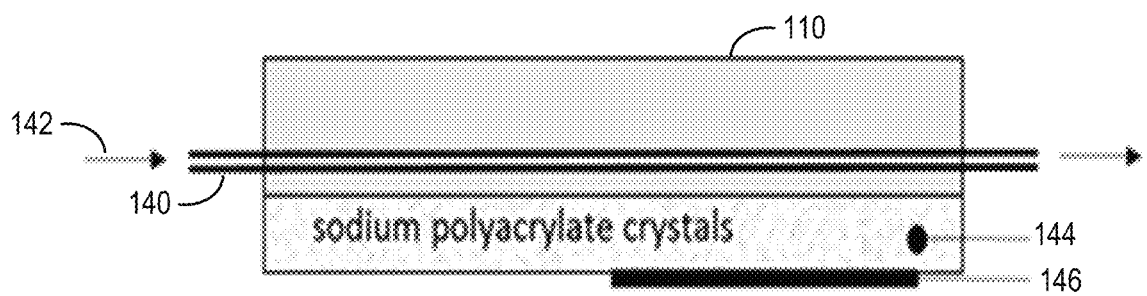
FIG. 4 depicts a humidity conditioner in accordance with the present technology comprising a length of sulfonated tetrafluoroethylene-based fluoropolymer-copolymer tubing passing through a container that contains a water vapor-permeable pocket of sodium polyacrylate crystals, and optionally including a container temperature controller.

Alternatively, the sodium polyacrylate crystals can be contained in a water vapor-permeable pocket that is housed within the humidifier, as shown in FIG. 4. FIG. 4 depicts a humidity conditioner in accordance with the present technology comprising a length of sulfonated tetrafluoroethylene-based fluoropolymer-copolymer tubing passing through a container that contains a water vapor-permeable pocket of sodium polyacrylate crystals, and optionally including a container temperature controller. The sodium polyacrylate is a super-absorbent material, capable of taking up to as much as 30 times is weight in water. It is available commercially for a variety of applications. It serves as a water absorbent in diapers and pet pads, as well as a water source for plants or for cigar humidors. It has the chemical property that it releases or absorbs water vapor to maintain a relative humidity near 80% in the air space that surrounds the crystals. When the desired target for humidification is near 80%, this is a better option than the liquid water bath illustrated in FIG. 1, which will tend to bring the flow to near 100%. It has the further advantage that there is no liquid that could spill.

Figure 5:
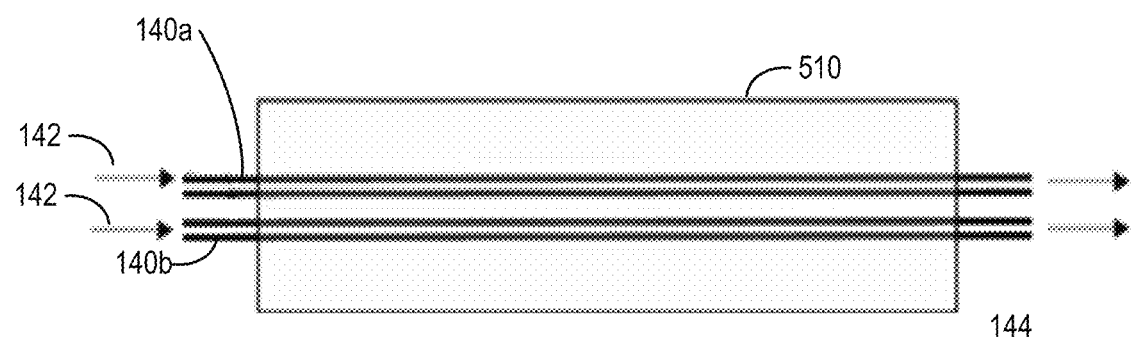
FIG. 5 depicts a humidity equalizer in accordance with the present technology comprising two lengths of sulfonated tetrafluoroethylene-based fluoropolymer-copolymer tubing carrying sample flow pass through a container, which optionally may contain water or sodium polyacrylate crystals for humidification, and that optionally may include a container temperature controller.

FIG. 5 shows a "humidity equalizer", and shows separate flows 142a, 142b each contained in its own sulfonated tetrafluoroethylene-based fluoropolymer-copolymer tube 140a, 140b, passing through a common humidity conditioner. Two flow paths are shown, but multiple flow paths are possible. This configuration applies to dual, or multichannel, condensation particle counters which make simultaneous measurements in two or more flows. In some applications, such as simultaneous indoor and outdoor sampling, the relative humidity of the different channels may vary. As the long-term performance of water-based condensation particle counters may depends on the humidity of the sampled air flow, the humidity equalization ensures equal performance among the channels.

One application is dual channel system 502a for assessing particle concentrations inside, and immediately outside, a respirator mask while it is being worn. This is illustrated in FIG. 9. An important aspect in the performance of a respirator is how well it fits on the subject's face, that is whether or not air leaks around the respirator, rather than passing through its filters. A standard test of how well a respirator fits the subject is to compare the concentration of particles inside the mask to that outside the mask. The measurement inside the mask is done by sampling through the 'drink tube' provided in such respirators, while the ambient measurement is made through a tube clipped near the subject's breathing zone. If the particle counting is done is with an instrument such as a condensation particle counter which is sensitive to ultrafine particles, then the natural abundance of particles in the air is adequate to provide sufficient statistics for this test. However, ambient particle concentrations are quite variable in time. Thus, it is best to have simultaneous measurements inside, and outside, of the mask while it is being worn. Water-based condensation particle counter systems, which are environmentally friendlier than alcohol-based condensation particle counters, can be affected by the difference in the humidity between the two flows. The flow from inside the mask will be humidified from the wearer's breath and will be much higher than the relative humidity for the line sampling the ambient air outside the mask, except for very humid environments. The humidity equalizer 502a exchanges water vapor between the two lines while maintaining the particle concentrations in each line, facilitating more balanced and equal measurements between the two lines. As illustrated in FIG. 9, this can be accomplished by passing the two flows through a humidity equalizer 502a consisting of sulfonated tetrafluoroethylene-based fluoropolymer-copolymer tube housed in a small chamber (or pocket) 802 (similar to FIG. 4) containing wetted, polyacrylate crystals. Experiments show that if each channel has a flow of 100 $cm^3$/min, a length of 70 mm of sulfonated tetrafluoroethylene-based fluoropolymer-copolymer housed with the wetted, polyacrylate crystals is adequate to equalize, within 10%, the relative humidity between the two channels. There are several advantages if the polyacrylate crystals are contained within a small netted pocket 802, permeable to water vapor. First, no liquid water is required, and thus the system is motion tolerant. Second, the system can be designed such that the pocket of polyacrylate crystals is readily removed, rejuvenated by soaking in water, and returned to the humidifier.

Figure 2:
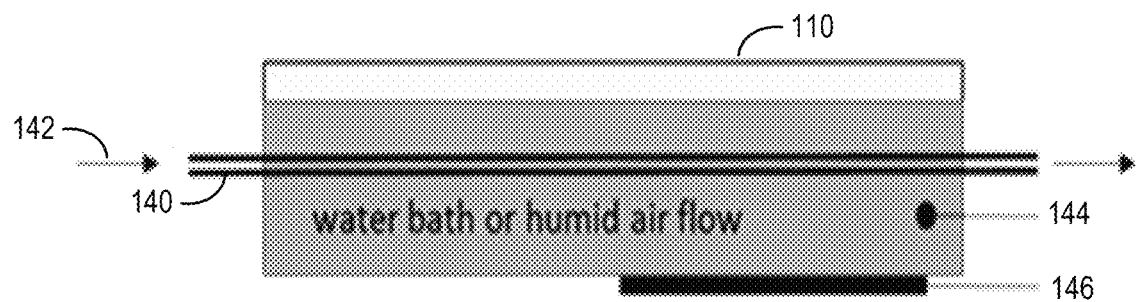
FIG. 2 depicts a prior art humidifier known consisting of a length of sulfonated tetrafluoroethylene-based fluoropolymer-copolymer tubing contained within a water bath, and optionally with a means of controlling the temperature of the water bath.
Figure 6:
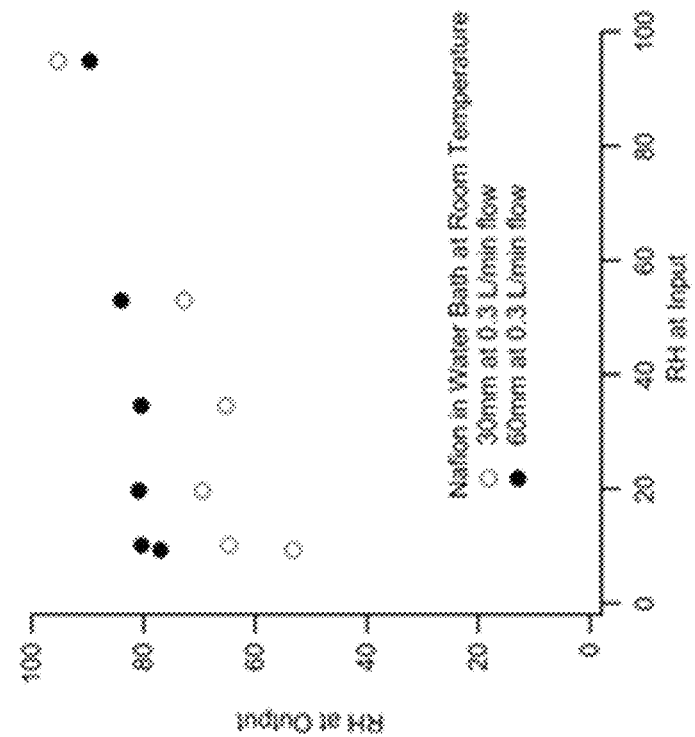
FIG. 6 is a graph of relative humidity of the flow at an inlet and outlet of a humidifier of the configuration of FIG. 2, with operation at 20°-25° C.

FIG. 6 shows data on the performance of a standard-type humidifier of the configuration of FIG. 2. Relative humidity of the flow at inlet and outlet are shown for flow passing through a sulfonated tetrafluoroethylene-based fluoropolymer-copolymer tube submerged in a water bath, with operational temperatures of 20°-25° C. Active length is 30 mm or 60 mm, as indicated by the legend, and flow is 300 $cm^3$/min. This is a higher flow, in proportion to the length of the tubing, for full humidification. Yet the approach significantly increases the relative humidity for dry flows. The output relative humidity is always above 50% for the shorter tube length, and above 80% for the longer length. At input relative humidity above 90% the change in relative humidity is small. As is characteristic of convective diffusion in a laminar flow in a tube, the extent of water vapor transport depends on the ratio of the length of the tube to the flow rate. For the data of FIG. 6 we find that the 30 mm length at 300 $cm^3$/min flow, or a length to flow rate ratio of 0.6 $s/cm^2$, provides sufficient humidification at temperatures of 20°-25° C. A humidifier with twice this length, such that the ratio of length to flow rate is 1.2 s/cm², gives uniformly high relative humidity across a wide range of input relative values.

Figure 7:
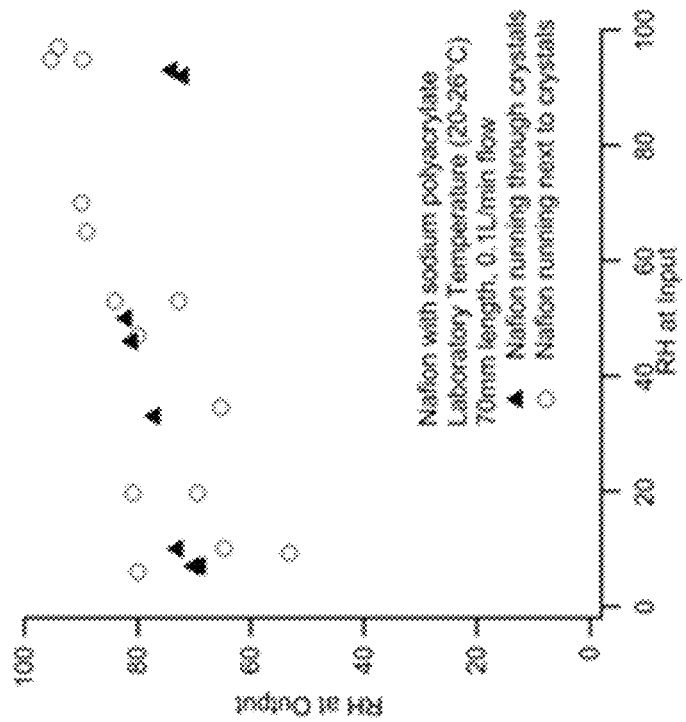
FIG. 7 is a graph of the relative humidity of the flow at inlet and outlet of a humidity conditioner containing sodium polyacrylate crystals with operation at 20°-26° C.

FIG. 7 shows data from the humidity conditioner of this invention, which uses sodium polyacrylate crystals in place of the water bath. Before placing in the humidifier, these crystals are wetted with water, such that the water molecules absorb onto the crystals. For the configuration of FIG. 3, with the sulfonated tetrafluoroethylene-based fluoropolymer-copolymer running through the crystals, and with operation at room temperature, the exiting relative humidity is in the range of 70% to 80%, regardless of the input relative humidity. When the sulfonated tetrafluoroethylene-based fluoropolymer-copolymer tube is placed in the airspace surrounding the crystals, the conditioner responds a bit more like the water bath system of FIG. 6.

We find that if a flow of 100 cm³/min passes through a 70 mm length of sulfonated tetrafluoroethylene-based fluoropolymer-copolymer tubing surrounded by wetted sodium polyacrylate salt, the relative humidity of the output flow is approximately 80%, regardless of whether the humidity at the input was 10% or 90%. The corresponding ratio of the length of the tube (7 cm) to the flow rate (100 cm/min=1.7 cm/s) is 4 s/cm². A convenient feature of using the sodium polyacrylate is that it is easily contained within a small water vapor-permeable pocket that is readily rejuvenated. This pocket becomes the bed of polyacrylate crystals shown in FIG. 4. This pocket can be readily removed from the humidifier, rejuvenated by wetting with, or soaking in, water, and then returned to the humidifier. The data of FIG. 7 labeled "Nafion running next to crystals" was obtained with just such configuration. The polyacrylate was contained within a pocket comprised of a fine net that prevented escape of the crystals, which are several tenths of millimeters in size, and yet is completely permeable to water vapor. Because there is no liquid water in the system, it does not have the potential of leaking as does the water-bath configuration of FIG. 2.

Other salts of polyacrylate could be employed equally well, but the sodium polyacrylate is a commonly used water absorbent. Like many salts, the polyacrylate has a water vapor equilibrium value that is less than 100%. In the case of polyacrylate, this value is near 80%. Polyacrylate has the further advantage that it can absorb large amounts of water, while maintaining its crystalline form. This offers the practical advantage that water is stored without the potential for leaking of liquid water.

Figure 8:
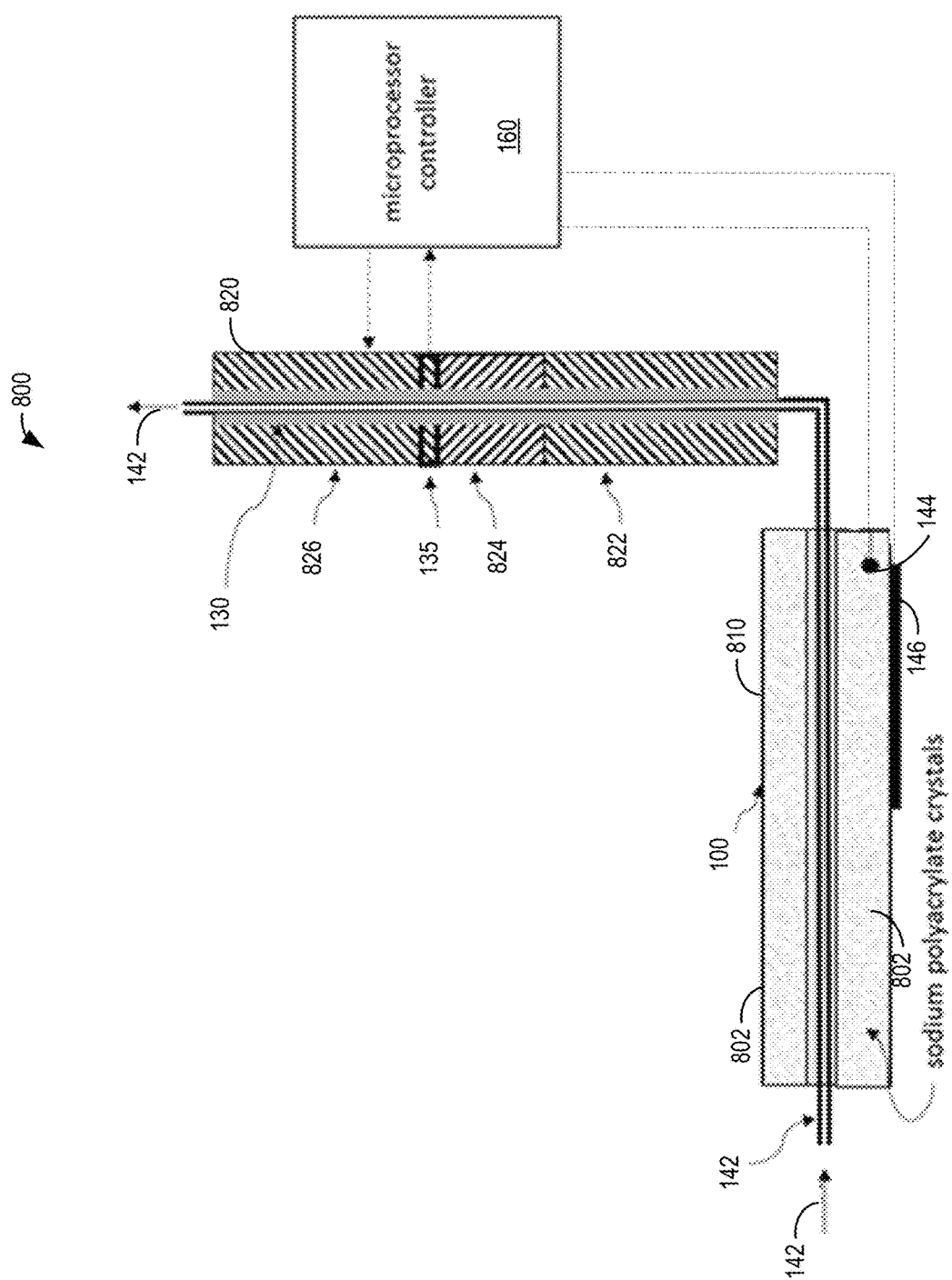
FIG. 8 depicts a humidity conditioner containing sodium polyacrylate crystals shown coupled to a water-based particle condensation system equipped with a continuous wick, a wick sensor, a stage for internal water vapor recovery, and a controller to regulate the temperature of the water recovery stage.

FIG. 8 is another alternative embodiment of the technology. FIG. 8 depicts a humidity conditioner 810 containing sodium polyacrylate crystals shown coupled to a water-based particle condensation system 820 equipped with a continuous wick, a wick sensor, a stage for internal water vapor recovery, and a controller to regulate the temperature of the water recovery stage. FIG. 8 also shows temperature control of the humidifier by means of the heater 146, controlled by the microprocessor to reach a desired temperature as measured by the temperature sensor 144. From experimental data, this is not needed if operations are at typical indoor temperatures (18-30° C.), but may be useful for operation in environments that are very cold.

FIG. 8 shows the humidity conditioner 810 containing a pocket 802 of polyacrylate crystals (similar to that of FIG. 4) coupled to the self-sustaining water condensation growth tube 820 of the type described by Hering et al. (2019). The growth tube 820 has three temperature stages 822, 824, 826 (each represented by different cross-hatching in the figure), lined by a continuous wick 130. The first stage 822 has cooled walls, typically around 5-15° C., and both cools the flow and captures water vapor from the sampled air flow 142 onto the wick. The second stage 824 is warm, typically 30° C. to 40° C. warmer than the first stage. Water evaporates from the wet wick walls in this stage, and diffuses into the cooler, entering flow, thereby creating the water vapor supersaturation necessary to activate the condensational growth of small particle suspended in the flow. The third stage 826 is again cooled and recovers water vapor from the flow into the wick. The recovered water is transported to the warm, second stage via capillary action. Within the third stage condensational growth continues as the supersaturation is maintained because both the temperature and water vapor decrease at similar rates. At the exit of the growth tube the flow is cold, close to the temperature of the walls of the third stage, but it is still saturated, or somewhat supersaturated, and contains droplets formed around individual particles in the sampled air flow.

Hering et al. (2019) explored the relationship between the water content of the flow exiting a three-stage growth tube such as that shown in FIG. 8, and the growth tube operating temperatures. It was found that the absolute humidity of the exiting, droplet-laden flow could be as low as 8° C., or as high as 20° C., without compromising the efficiency of droplet formation. Thus, provided that the dew point of the sampled air flow at the inlet of the growth tube is above about 8° C., it is possible to operate the system in a manner in which the net water consumption is near zero. Essentially, enough water vapor can be captured to maintain a wetted wick. The 8° C. dew point corresponds to a relative humidity greater than 40% at 22° C. Prevailing ambient absolute humidity values are often less than this. Yet, when coupled to the humidity conditioner, the system could sustain operation with respect to the water consumption, for long periods of time.

FIG. 8 also shows a wick sensor 135, which detects the local water saturation level of the wick. This provides a feedback signal to control the extent of water recovery in by the wick and facilitates maintenance of the wick at the desired water saturation level. For proper operation the wick must be sufficiently wet to generate the high supersaturation required for particle activation and growth, yet not so wet that is cannot take up water vapor that condenses on its surface. Were water to condense onto the wick, and not be absorbed by the wick, condensation droplets form that can eventually lead false counts, and even to flooding of the optics when used as a condensation particle counter. Thus, proper saturation level within the wick is important parameter to condensational growth performance. To maintain the proper saturation level, a microprocessor uses the signal from the wick sensor to set the temperature of the third, water recovery stage of the growth tube, and optionally also of the humidity conditioner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An apparatus, comprising:

a humidifier coupled to a water-based condensation growth system, the humidifier comprising a tube comprising sulfonated tetrafluoroethylene-based fluoropolymer-copolymer surrounded by a region containing wetted crystals of polyacrylate salt;

wherein a gas sample flows through the sulfonated tetrafluoroethylene-based fluoropolymer-copolymer tube into the condensation growth system.

2. The apparatus of claim 1 wherein the length of the tube is about 70 mm.

3. The apparatus of claim 1 wherein a ratio of a length of the tube to the volumetric flow rate of air or other gas through the tube is more than 4s/cm².

4. The apparatus of claim 1 wherein the temperature of the humidifier is controlled to within the range of 20–30° C.

5. The humidifier of claim 1 the polyacrylate salt crystals are contained within a water vapor-permeable pocket.

6. The humidifier of claim 5 the polyacrylate crystals are contained within a water vapor-permeable pocket that is readily removed to facilitate wetting of the crystals.

7. The humidifier of claim 1 containing two or more tubes to provide equal humidity conditioning of separate air or gas flows.

8. The humidifier of claim 7 configured for conditioning of air flows for a dual channel condensation particle counter sampling simultaneously from inside and outside of a respirator mask.

* * * * *